United States Patent [19]
Ohsawa

[11] Patent Number: 4,919,111
[45] Date of Patent: Apr. 24, 1990

[54] IGNITING APPARATUS

[75] Inventor: Jiro Ohsawa, Tokyo, Japan

[73] Assignee: Win Lighter Corporation, Tokyo, Japan

[21] Appl. No.: 267,298

[22] Filed: Nov. 4, 1988

[30] Foreign Application Priority Data

Jun. 16, 1988 [JP] Japan .................................. 63-149024
Jul. 19, 1988 [JP] Japan ............................ 63-95463[U]

[51] Int. Cl.⁵ ........................ A47J 37/00; F23D 14/46
[52] U.S. Cl. ............................. 126/25 B; 431/345; 431/344; 431/256; 431/266
[58] Field of Search ............... 431/344, 345, 128, 255, 431/256, 264, 266; 126/25 B

[56] References Cited

U.S. PATENT DOCUMENTS 3,441,360  4/1969  Johnson ............................. 431/345
4,190,034  2/1980  Wonisch ............................ 126/25 B
4,348,172  9/1982  Miller ............................. 431/345 X Primary Examiner—Randall L. Green
Attorney, Agent, or Firm—Staas & Halsey

[57] ABSTRACT

This invention relates to an elongated apparatus including a grip member which has a fuel reservoir and a gas supply valve therein, and an ignition mechanism having the burner nozzle connected with the reservoir. A middle member uniting the grip member and the ignition member together. The ignition mechanism is built-in and the flame produced thereby is sustained for as long as required.

15 Claims, 22 Drawing Sheets

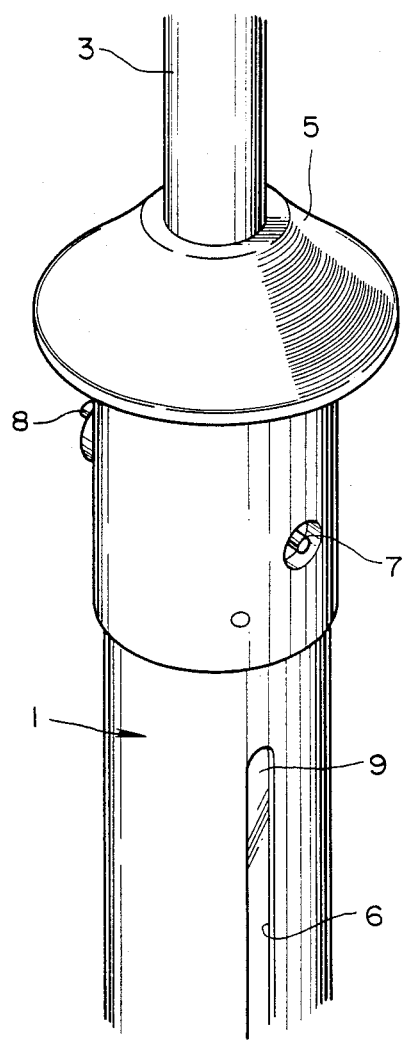
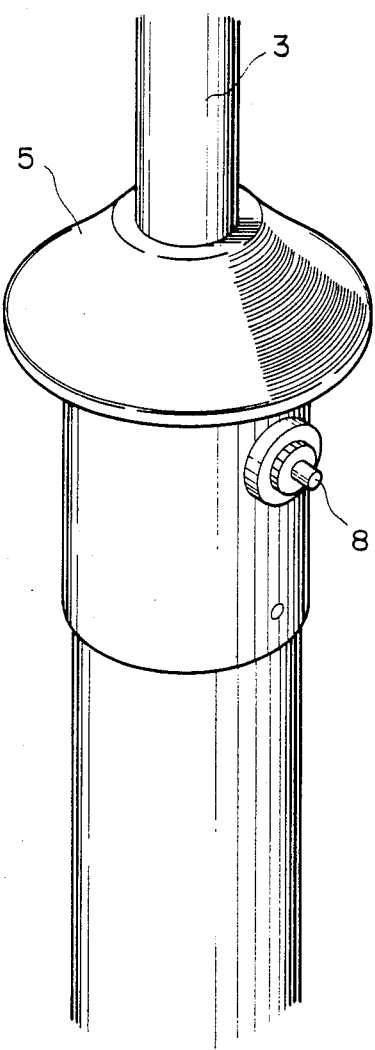

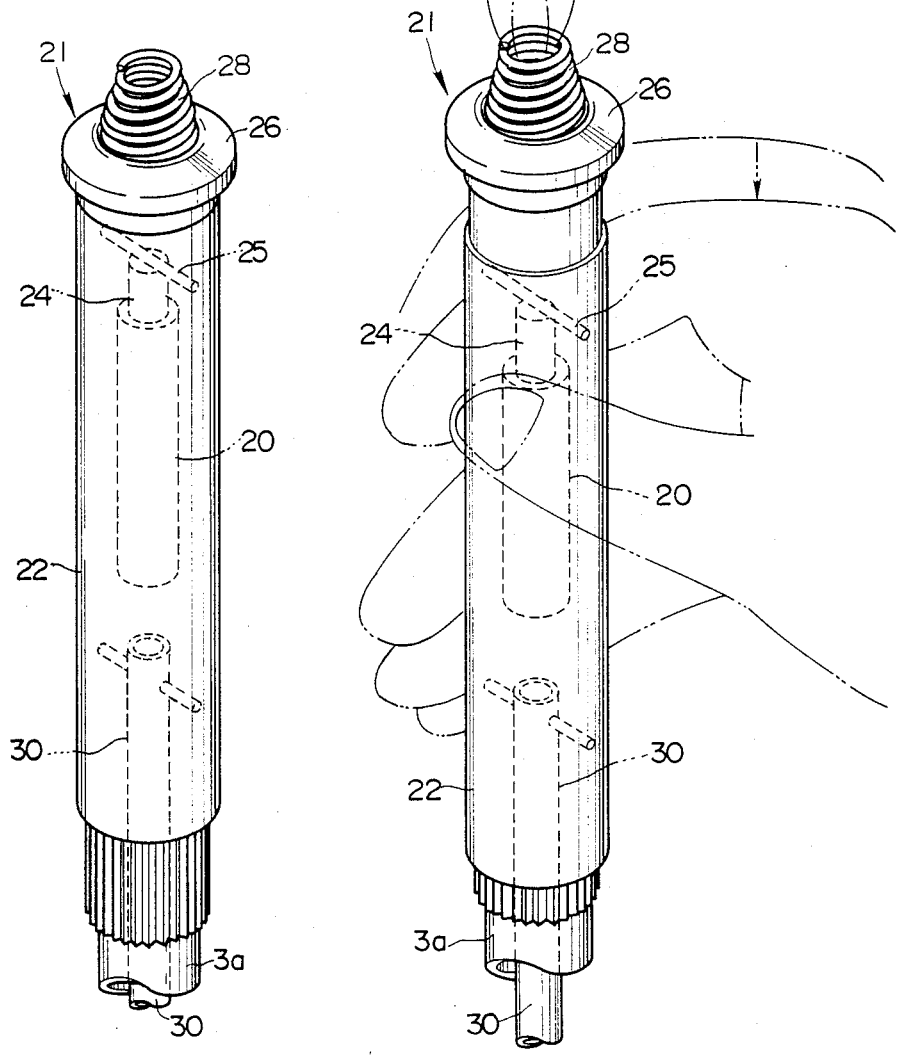

IGNITING APPARATUS

BACKGROUND OF THE INVENTION

1. Field of the Invention

This invention relates to an igniting apparatus having a grip member and an elongated igniting member independently separable therefrom, like a long torchlight for lighting a candle on a table during a wedding reception or party.

2. Description of the Related Art

In the past, it was well known that an igniting apparatus with a total length of about 60 centimeters to 1 meter was used for lighting candles at a wedding reception or at a party. Sometimes, it was used for lighting a candle in a church or the votive light in a temple, or else used for lighting fires in fireplaces.

In general, this kind of an igniting apparatus is equipped with a gas fuel reservoir in liquid condition at the grip member, while a burner valve is prepared on the top part connecting with the said reservoir via a gas pipe. A gas supply valve formed on the reservoir is operable to release the fuel gas at the burner nozzle, whereon a flame is obtained by firing different igniting means such as match, torch, lighter and so on.

As above explained, in order to obtain the flame, another different igniter is needed, whereas it causes some inconveniences or problems. During the party or the church ceremony, if the obtained light goes off suddenly on account of winds or other reasons, it shall greatly damage the atmosphere therewith. If it is not re-lit by another igniting means instantly, it shall take some more time to re-light than expected.

SUMMARY OF THE INVENTION

The present invention has been developed to resolve the aforementioned problems.

An object of the present invention is to provide an igniting apparatus with a built-in electric igniting means that can catch fire on the fuel gas released from the burner valve without any help from a different igniter.

Another object of the present invention is to provide an elongated lighting apparatus including a grip member, the igniting member and also the middle member existing just in the middle and uniting the said grip member and the said igniting member together.

Another object of the present invention is to supply an igniting apparatus with a bigger capacity reservoir with a gas supply valve on the upper part of the reservoir at the shortest distance to the igniting member.

This invention has another object to provide an igniting apparatus which is less expensive and in better order by adopting a simpler mechanism to obtain the best time interval and the shortest distance between the gas supply and the electric spark emission. It has a further object to provide an ignition apparatus capable of easy manual operation for mechanically controlling both the ignition and the gas supply accordingly.

It has also an object to provide an ignition apparatus equipped with means to keep the gas supply valve open and also with means to interrupt the open means as the gas supply is closing. In reference to the open means, another object is to keep the valve open so that a continuous burn is sustained for the time required.

A further object is to provide an ignition apparatus with a visible and oblong window on the grip member, wherefrom the quantity of the remaining gas fuel may be easily recognized from the outside.

The present invention also has an object to provide an ignition apparatus equipped with stopper material capable of sliding horizontally, whereby the said stopper material keeps the gas supply valve opened constantly in conjunction with the stopper release button.

These and other objects of the present invention are met by providing a long ignition apparatus including a grip member wherein the gas fuel reservoir is prepared with the gas supply valve and the ignition member wherein the burner nozzle is connected to the gas supply valve via the gas pipe and finally the middle member having the said grip member on one end and the said ignition member on the other end wherein the gas pipe having a smaller diameter is formed in its inside, while the gas fuel release and electric sparking generation are obtained by the operation means which is linked with both the stopper means and the stopper release means to be worked by hand in the outside controlling the gas supply from the said valve so that the fuel supply valve is kept opened to sustain the continuous burn of the flame for the time interval as required or else the sustained flame is optionally extinguished.

BRIEF DESCRIPTION OF THE DRAWINGS

FIG. 2 and FIG. 3 are perspective views of the grip member of the FIG. 1 embodiment;

FIG. 7 and FIG. 8 are perspective diagrams indicating the operations of the said ignition member;

DETAILED DESCRIPTION OF THE PREFERRED EMBODIMENTS

The preferred embodiments are now explained below in accordance with the illustrated figures.

Figure 1:
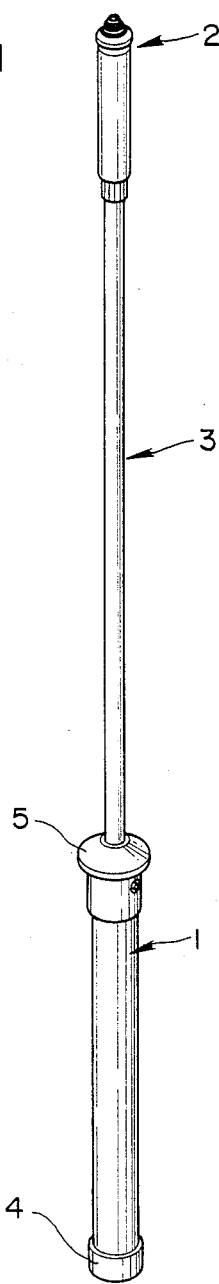
FIG. 1 is a perspective view of the igniting apparatus according to a preferred embodiment of the present invention.

FIG. 1 shows the whole subject in general developed by the present invention, and it comprises the grip member (1), the ignition member (2) and the middle or extension member (3) having the said grip member (1) on one end and the ignition member (3) on the other end, and the total length of the subject is around between 60 centimeters and 1 meter.

In the grip member (1), the fuel resevoir (9) is disposed containing the fuel gas in liquid condition, and in the ignition member (2), the electric spark generating mechanism and operation means are installed. In the middle member (3) is a gas pipe or conduit uniting the fuel reservoir (9) with the burner nozzle (27) (FIG. 10) of the ignition member (2). The operation means of the gas fuel supply in cooperation with the spark generating operation means are installed therewith.

The grip member (1) has a larger diameter cylinder shape than the middle member (3) and bottom part is closed with a cap (4). On the connecting part between the upper part of the grip member (1) and the middle member (3) a transition collar ring (5) is set for decorative purposes. In the grip member a window (6) is formed in the longitudinal direction, wherefrom the fuel volume remaining in the fuel reservoir (9) can be observed easily from the outside.

Adjacent to the said transition collar ring (5), an inlet valve (7) is disposed in order to refill fuel into the reservoir (9). On the opposite side of the said inlet valve (7) location, a stopper release button (8) is disposed, which functions to control the gas supply valve.

Figure 4:
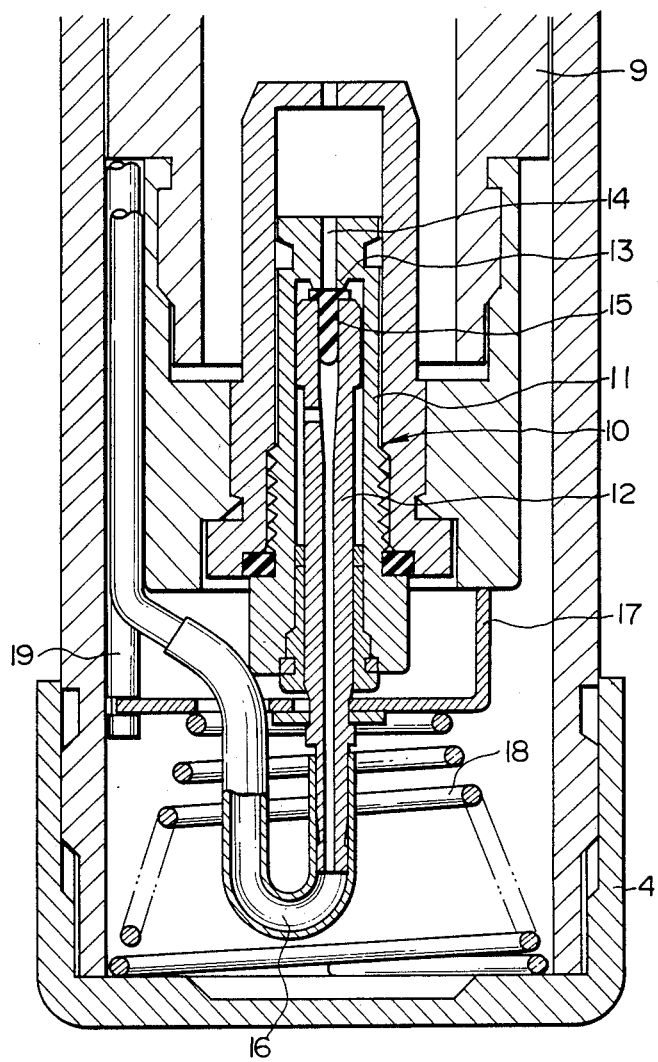
FIG. 4 and FIG. 5 are longitudinal sectional views indicating the operations and mechanisms of the gas supply valve of the FIG. 1 embodiment.
Figure 5:
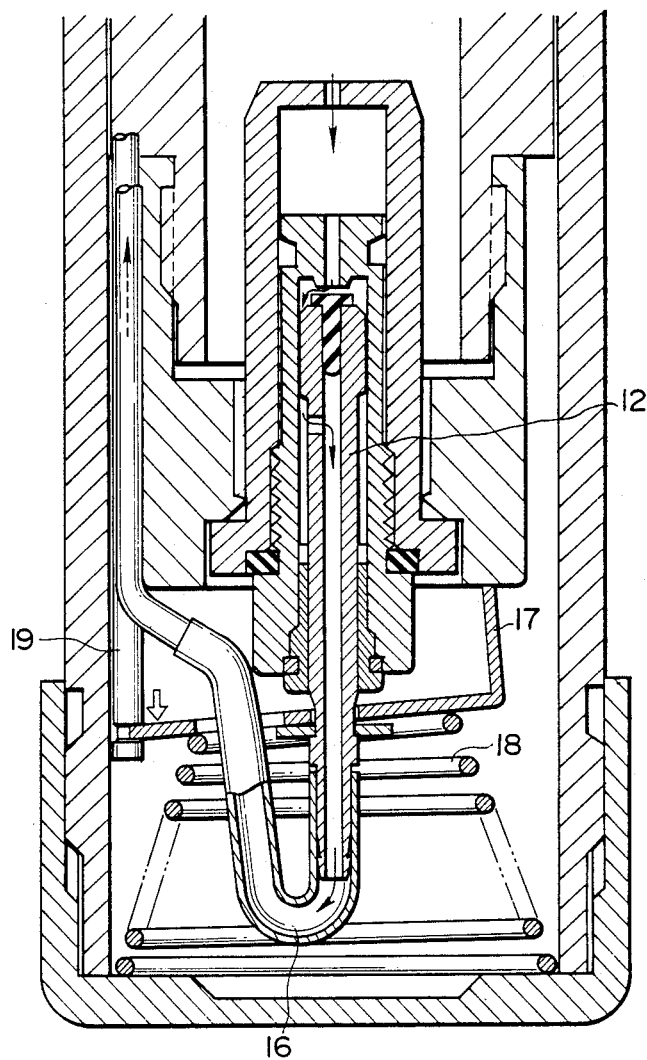
Figure 6:
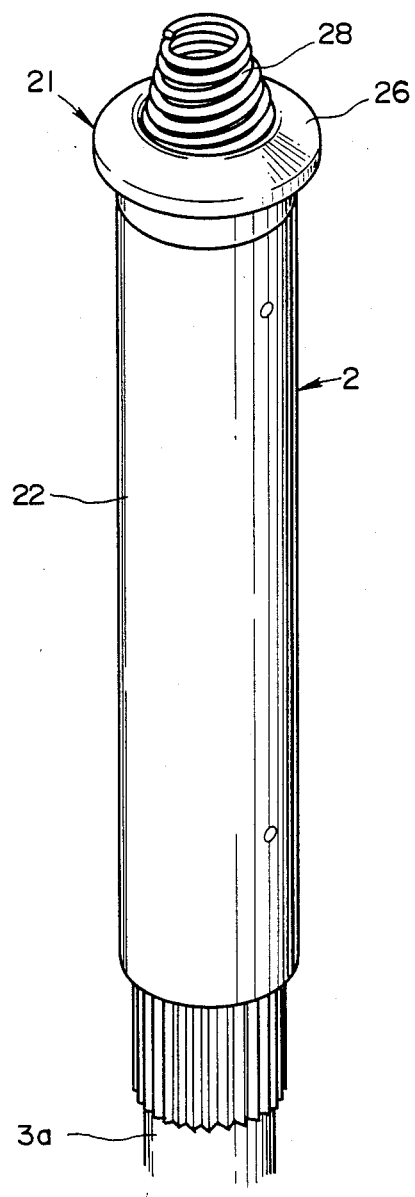
FIG. 6 is a perspective view of the ignition member of the FIG. 1 embodiment.
Figure 9:
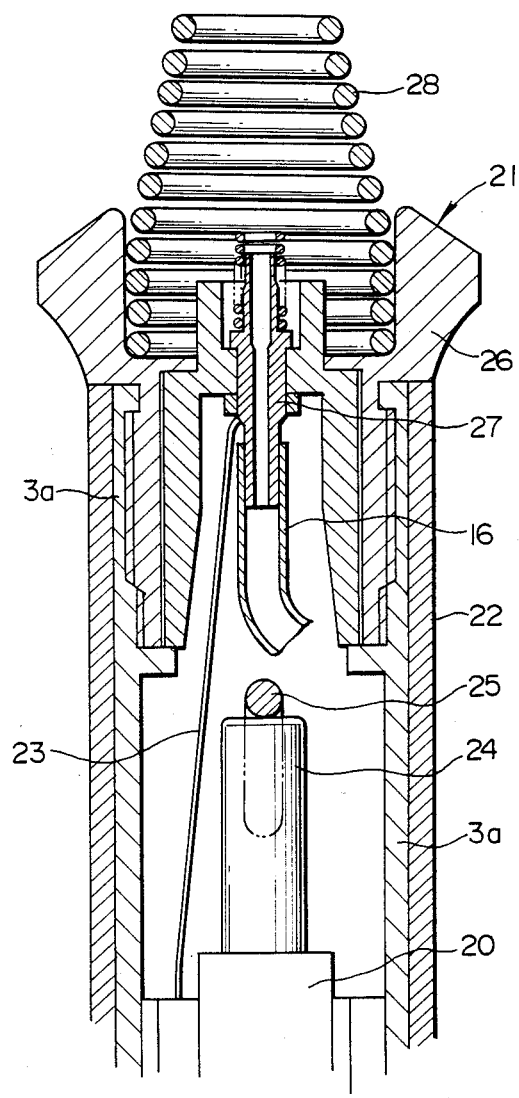
FIG. 9 and FIG. 10 are longitudinal sectional views of operations for the above FIG. 7 and FIG. 8.

With regard to FIG. 4 and FIG. 5, the fuel reservoir (9) is made of transparent material wherefore the remaining fuel can be recognized through the said window (6). On the bottom of the reservoir (9) a gas release valve (10) is provided to allow the out flow of the gas fuel from the said reservoir (9). A movable valve body (12) moves in a fixed cylinder (11) fitted tightly to the bottom wall of the said reservoir (9), and touches on or off freely to the valve seat (13) on its inner end at seal material (15) for controlling the opening of the valve aperture. On the other end outwardly it connects with the gas pipe (16) which is made of flexible material such as silicon tube or the like. A spring (18) is installed between the valve opening lever (17) and the cap (4). The spring (18) is usually in tension to push the said opening lever (17) and the said movable valve body (12) toward the closing position. On one end of the valve opening lever (17), the operating stick (19) is adapted to be connected thereto. When the operating stick (19) moves downwardly, the valve opening lever (17) is actuated to lower the movable body (12) toward the opening position. Thus, fuel gas flow is permitted from the reservoir (9) and comes into the gas pipe (16). The gas pipe and the operating stick (19) both extend upward along the circumference of the fuel reservoir (9). The gas pipe (16) extending upward on the said circumference is preferably provided with a metallic pipe segment of sturdy quality which connects to the flexible pipe segment, as shown in FIG. 4.

With regard to FIG. 6 to FIG. 10, the ignition member (2) includes substantially an upper end portion (3a) of the middle member (3), wherein an electric spark a generator (20) is built in. The top part of firing place (21) and an outer sleeve or operating cylinder (22) move axially along the circumference of the upper end portion (3a). As shown, the electric spark generator (20) is a piezo-electric system capable of producing high voltage by hitting the piezo element. The high voltage side is connected with the burner nozzle (referred later) through the lead wire (23) while the low voltage side is furnished with the body earth for safety.

Figure 10:
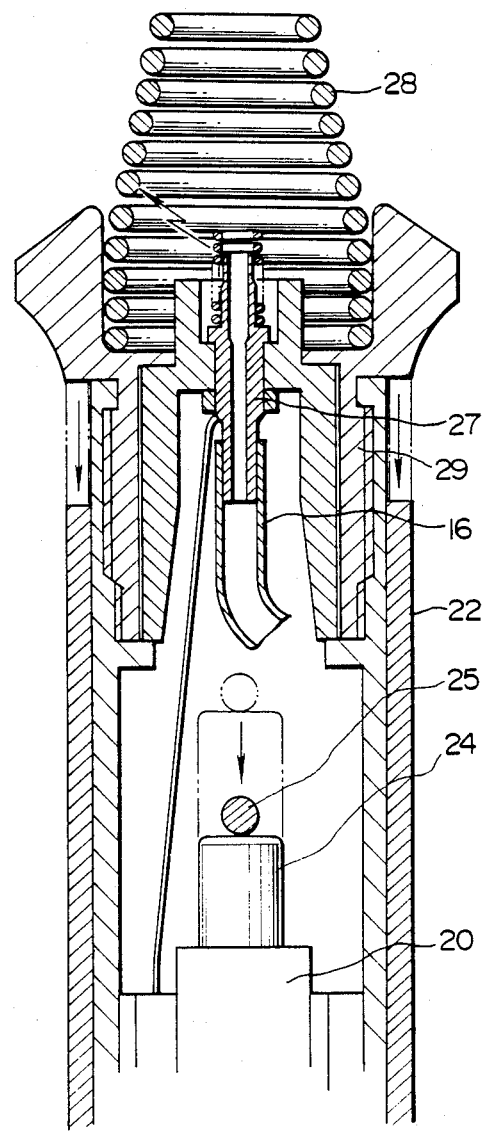

On the top end of the operating handle (24) for the device of electric spark generator (20), a first pin (25) is tightly fit and fixed to the operating cylinder (22). When the operating cylinder (22) is pushed down manually as shown in FIG. 8 and FIG. 10, the operating handle (24) comes down via movement of the first pin (25) and accordingly high voltage is obtained by the operation of the said device.

The top part of firing place includes a flange (26) seated on the upper end of the said upper end portion (3a) and burner nozzle (27) established in the said flange material (26) and windshield material (28) formed by a coil compression spring surrounding the said nozzle (27) in the frusto-conical style. On the lower part of the burner nozzle (27), the gas pipe (16) is connected, running through the grip member and the middle member from the gas supply valve (10). Also, the lead wire (23) is connected therewith from the device of electric spark generator. As shown in FIG. 10, the electric spark is generated in the gap between the tip of the burner valve (27) and the windshield material (28), whereon the fuel gas emitting via the said nozzle (27) through the gas pipe (16) catches fire. The ignited flame, as shown in FIG. 8, comes out over the top of the ignition member (2) to be protected from the wind by the windshield material (28).

The insulator (29) prevents the conductive materials like (3a) or (22) from electric sparking in the interior, whereas the said sparking directs inevitably to windshield material (28) from the tip of the nozzle (27).

Figure 12:
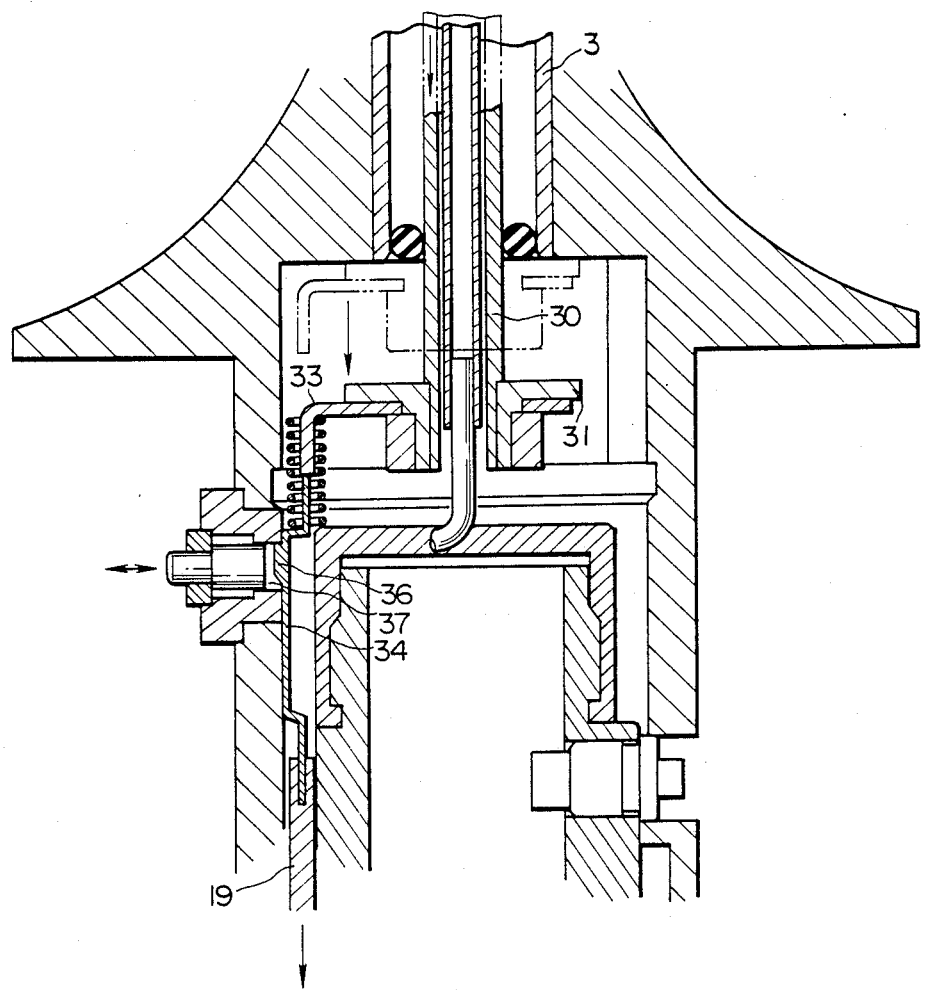
Figure 13:
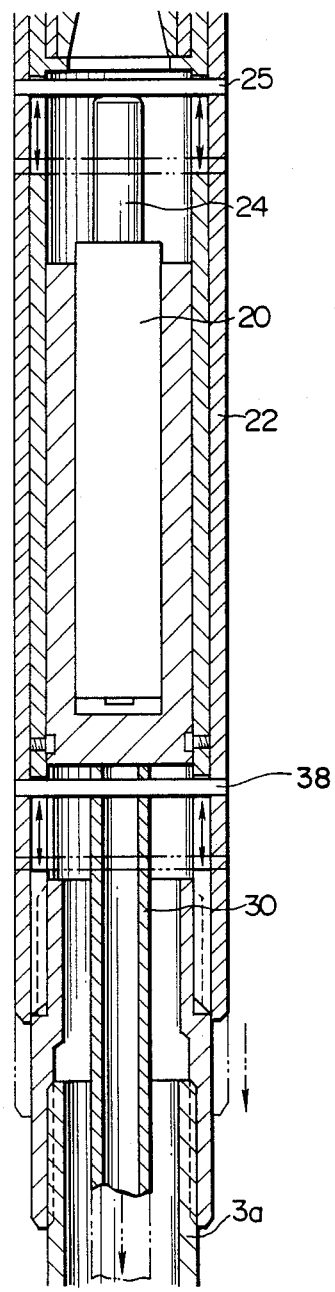
FIG. 13 is a longitudinal sectional view indicating the contact of the above operating pipe and the operation cylinder.

The middle member (3) is made of a pipe material with the required length and, a shown in FIG. 13, the operating pipe (30) having a small diameter is installed in its inside. The upper part of the operating pipe (30) is tightly fit and fixed to the operating cylinder (22) by the second pin (38), while the lower part is connected with the uniting material (31) seated on the upper part of the grip member (1). This can be seen in FIG. 11 and FIG. 12.

Figure 11:
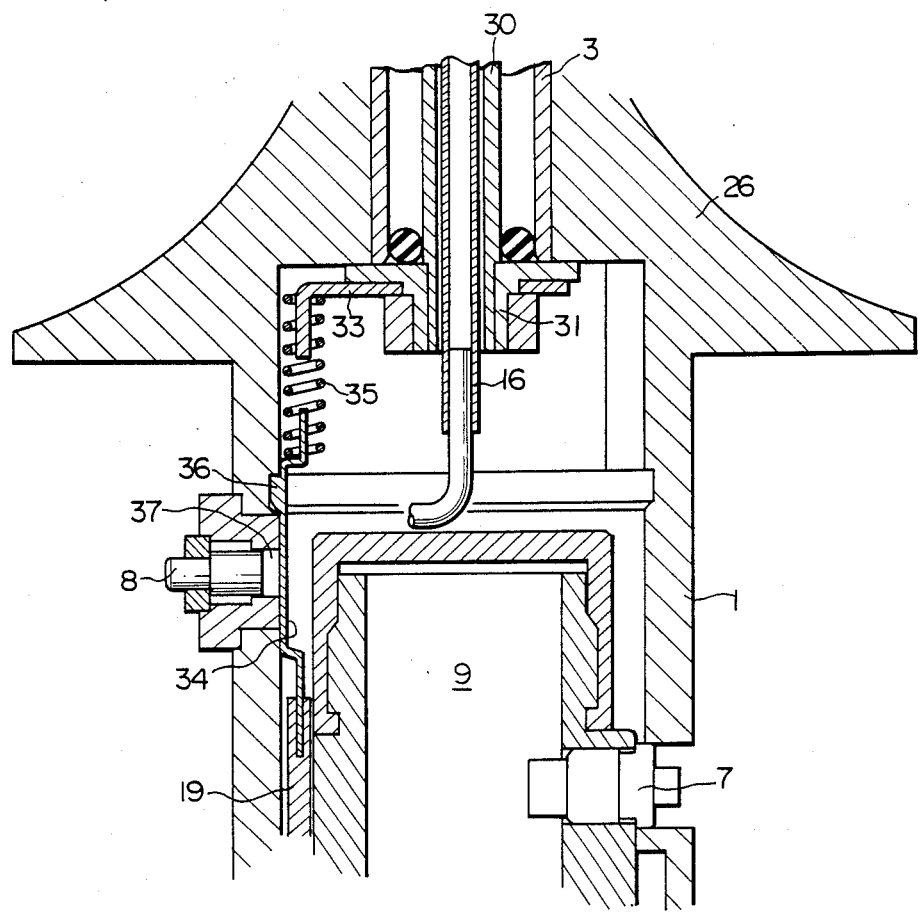
FIG. 11 and FIG. 12 are longitudinal sectional views indicating the operations and mechanisms of the operating pipe and the elastic movable body.

The gas pipe (16) extends upward through the said operating pipe (30) and arrives finally at the burner nozzle (27) through an opening (32). A movable piece (33) having an L-shape is tightly fit to the uniting material (31), while an elastic movable piece (34) made of a leaf spring is disposed in a small space with an end of the said movable piece (33). The elastic movable piece (34) is tightly connected on the upper part of the said generating stick (19). A tension coil (35) is biased to separate the movable piece (33) from the elastic movable piece (34). A stopper protrusion (36) is formed on the elastic movable piece (34) and, as shown in FIG. 11 and FIG. 12, the said protrusion is freely movable in or out of the hole (37) established in the grip member (1). The stopper release button (8) is also freely movable in or out of the hole (37). When the button (8) is pushed inwardly, the stopper protrusion (36) is pushed outwardly.

Figure 14:
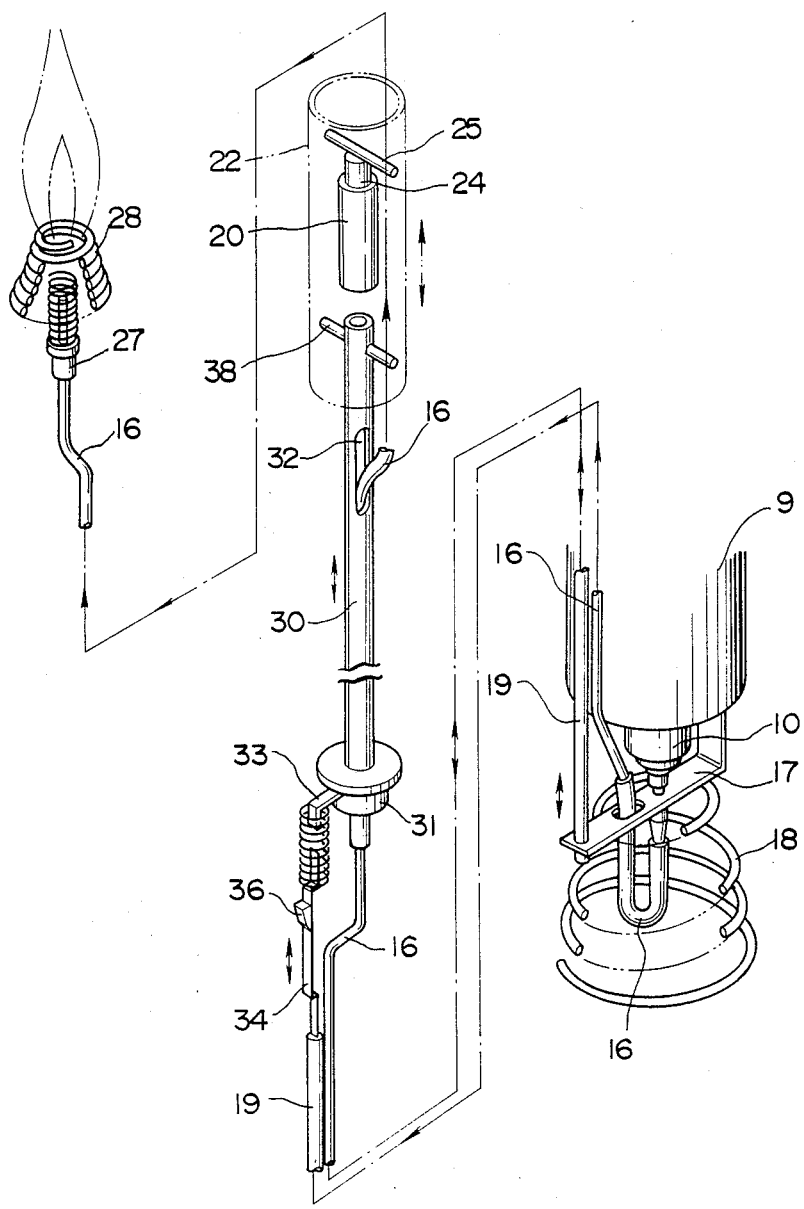
FIG. 14 is a perspective view indicating the operations and mechanisms for fuel gas release and the generation of high voltage according to the first preferred embodiment of the present invention.

Ignition is explained with reference to FIG. 14. First, the operating cylinder (22) is moved toward the grip member (1). In accordance with the travelling of the said cylinder (22) downwardly the operating handle

(24) and the operating pipe (30) moves downwardly accordingly sustained by the first pin (25) and the second pin (38). The downward movement of the operating pipe (30) effects to lower the uniting material (31) at its end and also effects to lower the elastic movable piece (34) via the movable piece (33). The downward movement of the said elastic movable piece (34) drives the stopper protrusion (36) until it comes in the hole (37), whereon the downward movement in general is stopped. The operating stick (19) is also moved downwardly to push the valve opening lever (17) downwards, wherefore the gas supply valve is opened and gas flow from the reservoir is initiated. The released gas flow runs through the gas pipe (16) and arrives at the burner valve (27) and finally emits in the air from the nozzle (27).

The operating handle (24) of the piezo-electric device (20) is moved down to generate high voltage, whereupon a spark is generated between the nozzle (27) and the windshield material (28) in the exact timing with the emission of gas fuel to catch fire and generate a flame.

After ignition, although the operating cylinder (22) is released from hand power and restored to its original position, the elastic movable piece (34) maintains its seat as it is, because the stopper protrusion (36) comes tightly into the hole (37), whereby a continuous supply of gas fuel is maintained. Therefore, a continuous burn is correctly sustained for the time required, and thus it can light plural candles or other objects.

In order to extinguish the flame, the stopper release button (8) is pushed into the hole (37). The stopper protrusion (36) is thus driven out of the hole (37), and the elastic movable piece (34) comes upward by tension power of the spring (18), as a result of which the valve opening lever (17) is restored to its original position to close the gas supply valve. With the gas supply stopped, the flame is extinguished.

On this embodiment, the device of electric spark generator (20) is explained as piezo-electric system, but this device of course can be replaced by other different methods such as electric battery system or other electronic systems. Different kinds of spark generation devices are known and easily understood by persons of ordinary skill in the art.

The spark generator (20) is located in the vicinity of the burner nozzle in this first embodiment, but it can be also established somewhere in a part of the grip member (1). In case the spark generator (20) is located in the grip member (1), the voltage fall might be incurred on account of the distance from the grip member (1) to the ignition member (2). Thus, a counter measure for such a fall will be needed.

In the first embodiment, the spark generator (20) and the operating pipe (30) are effected by the operating cylinder (20), which could be of course replaced by the lever mechanism or the bottom switch installed in the trip member (1). It is also understood that the sparking device and gas release supply can be prepared independently and separately without one linked function like this embodiment.

FIG. 15 to FIG. 24 show another embodiment. In this second embodiment, the gas release valve, the relative operating mechanism, the stopper mechanism and the inlet valve are different from those of the first embodiment. The remaining structure and methods of operation, however, are substantially the same, whereas the relative explanations are omitted therewith.

The same numbers are used on the same parts, while for the altered parts, the additional 100 series numbers are used.

Figure 15:
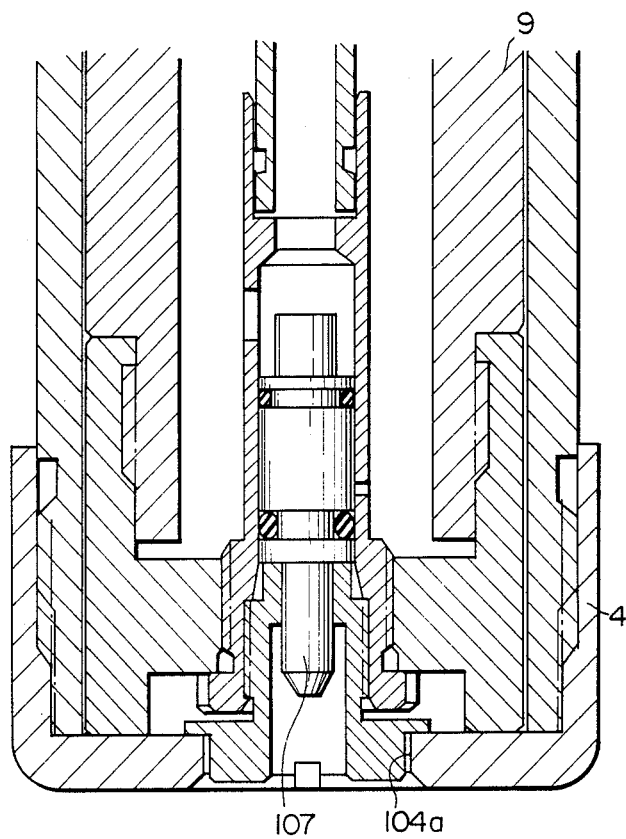
FIG. 15 is a partial sectional view of the bottom of the grip member of the second embodiment.
Figure 16:
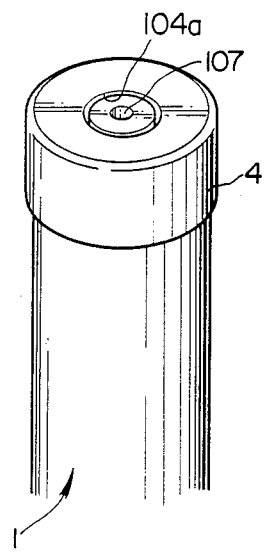
FIG. 16 is a perspective view of the grip member from the bottom side.

With reference to FIG. 15 and FIG. 16, an aperture (104a) is formed to expose an inlet valve (107) for refilling the fuel gas in the reservoir (9), whereby an extra refill can (not illustrated in the drawings) is connected with the tip of the inlet valve (107) formed at the bottom of the reservoir (9). The inlet valve (107) is of the same construction generally used for known pocket gas lighters. Thus, detailed explanations for the same are omitted.

Figure 17:
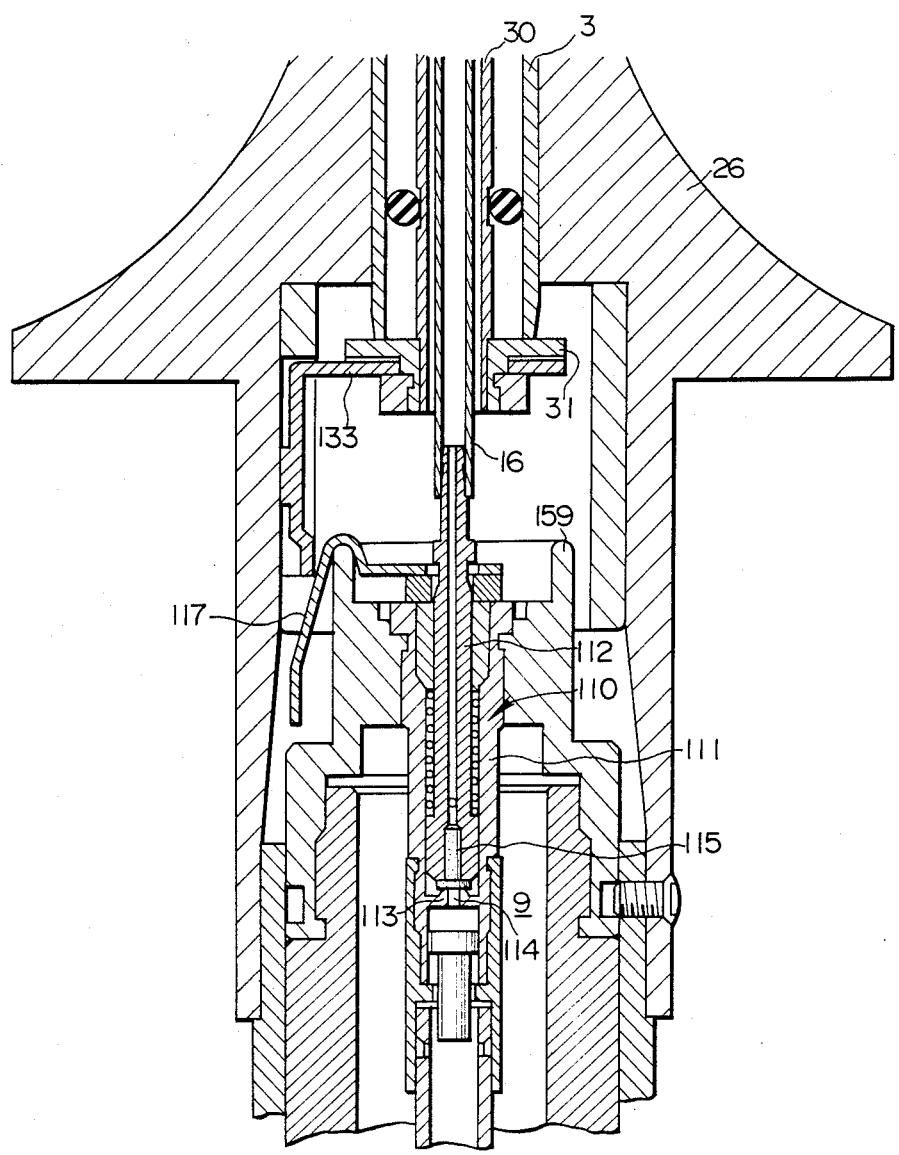
FIG. 17 and FIG. 18 are longitudinal sectional views indicating the operations and mechanisms of the gas supply valve of the second embodiment.
Figure 18:
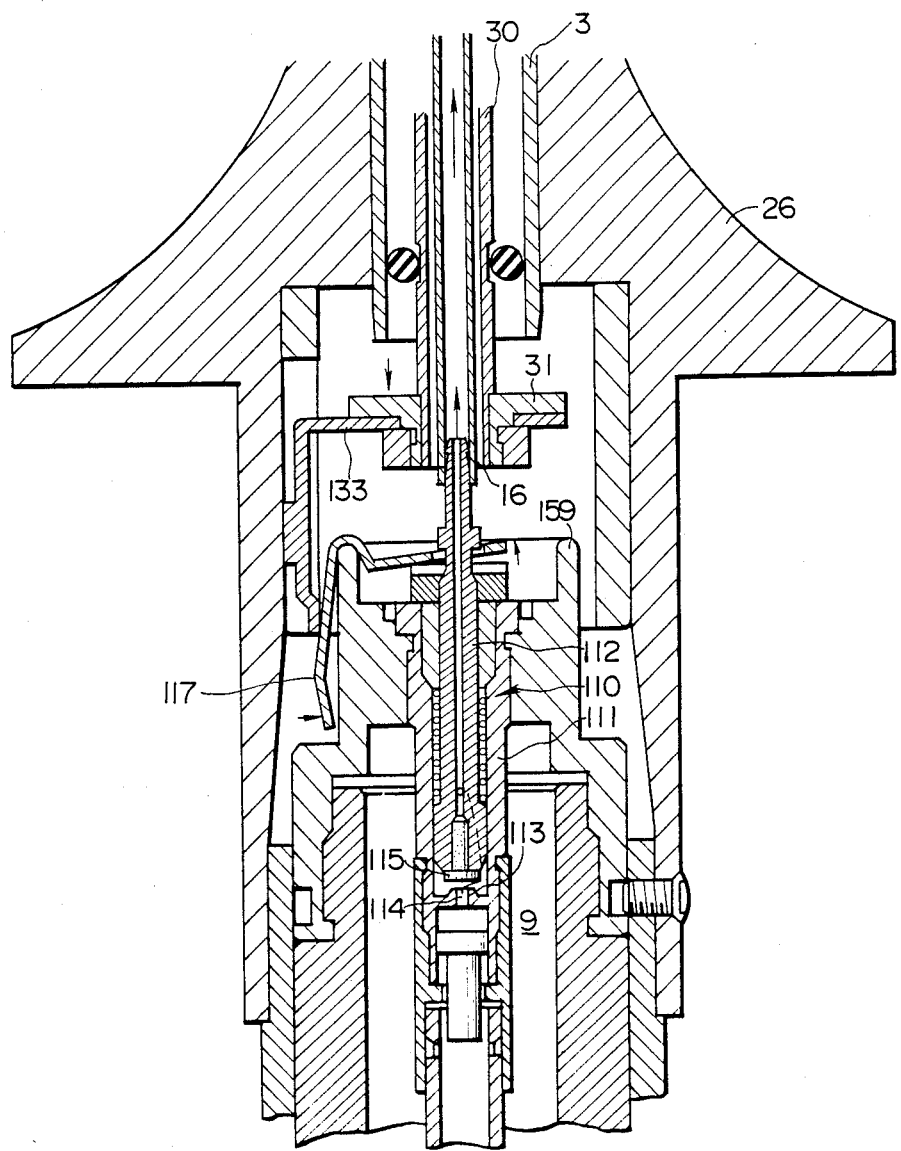
Figure 19:
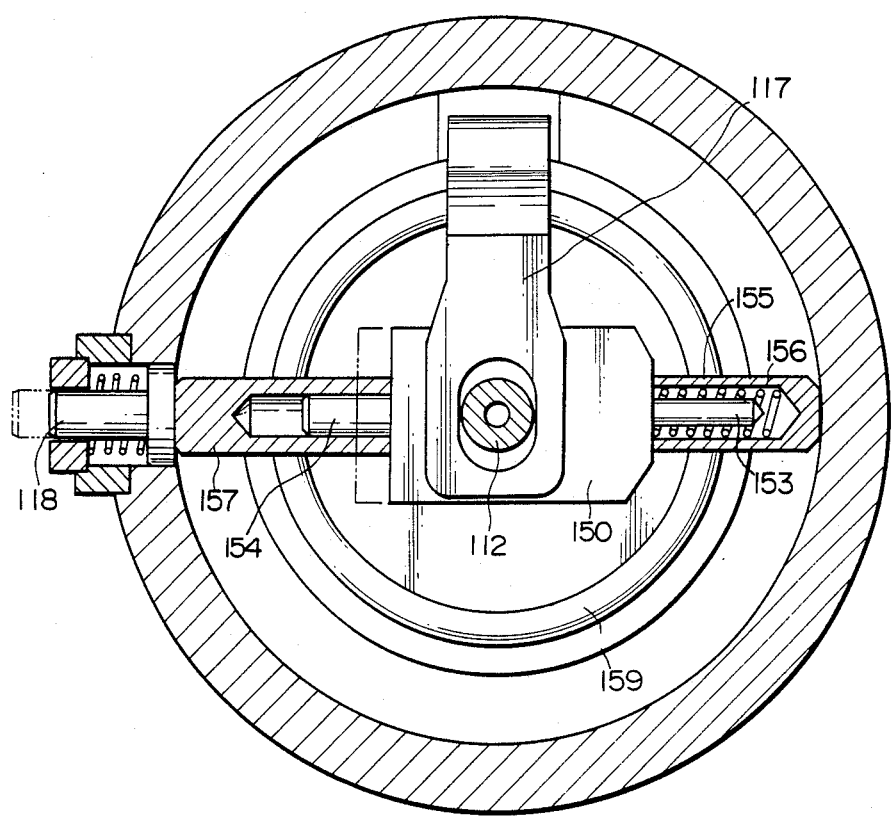
FIG. 19 is a sectional side view indicating the operations and mechanisms of the gas supply valve of the second embodiment.
Figure 20:
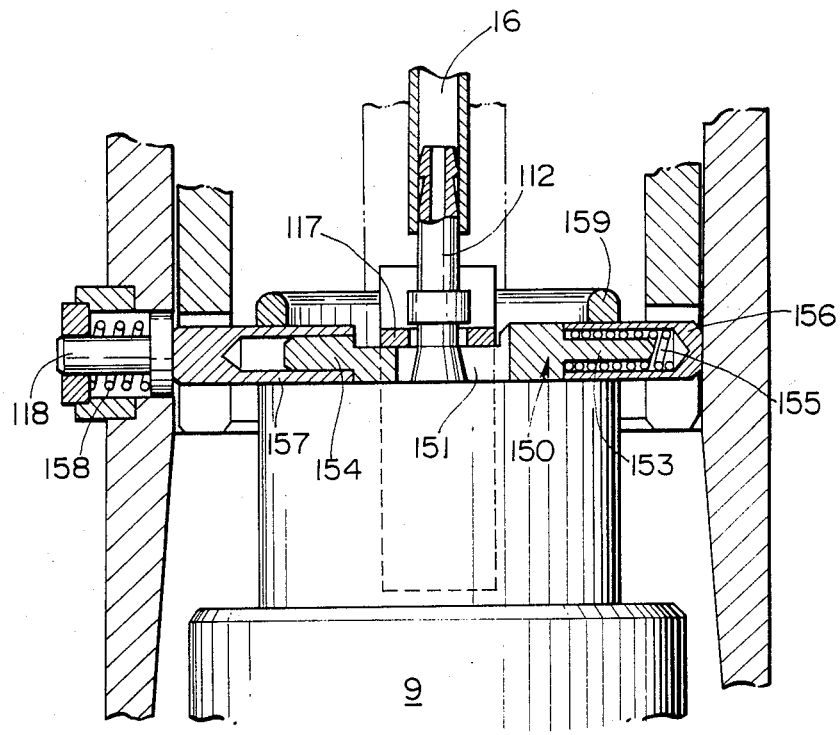
FIG. 20 and FIG. 21 are partial sectional views for the above FIG. 19.
Figure 21:
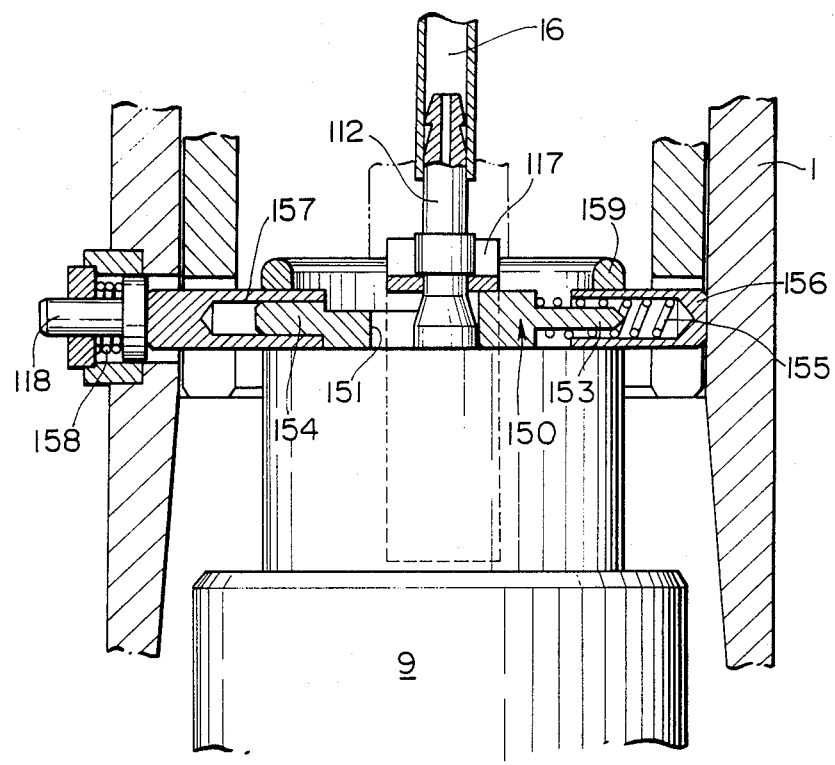
Figure 22:
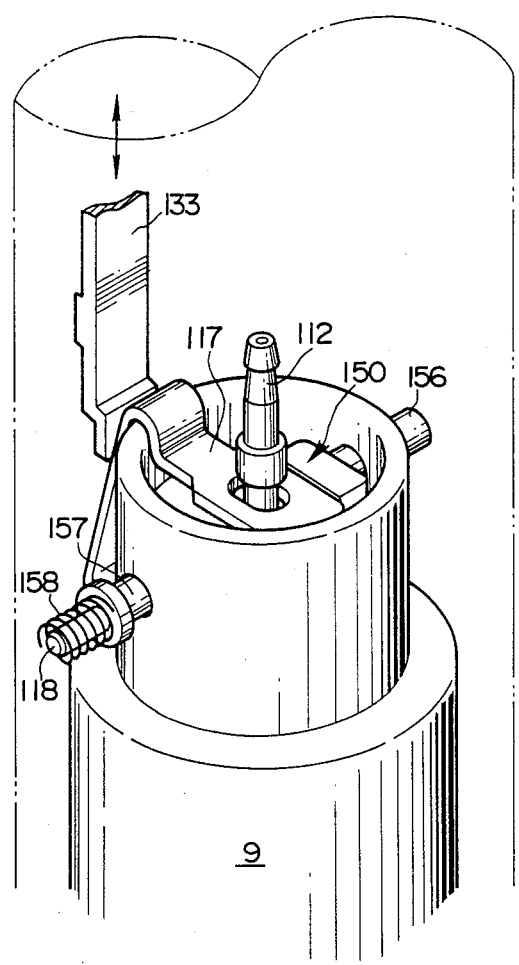
FIG. 22 is a perspective view of the above FIG. 19.
Figure 23:
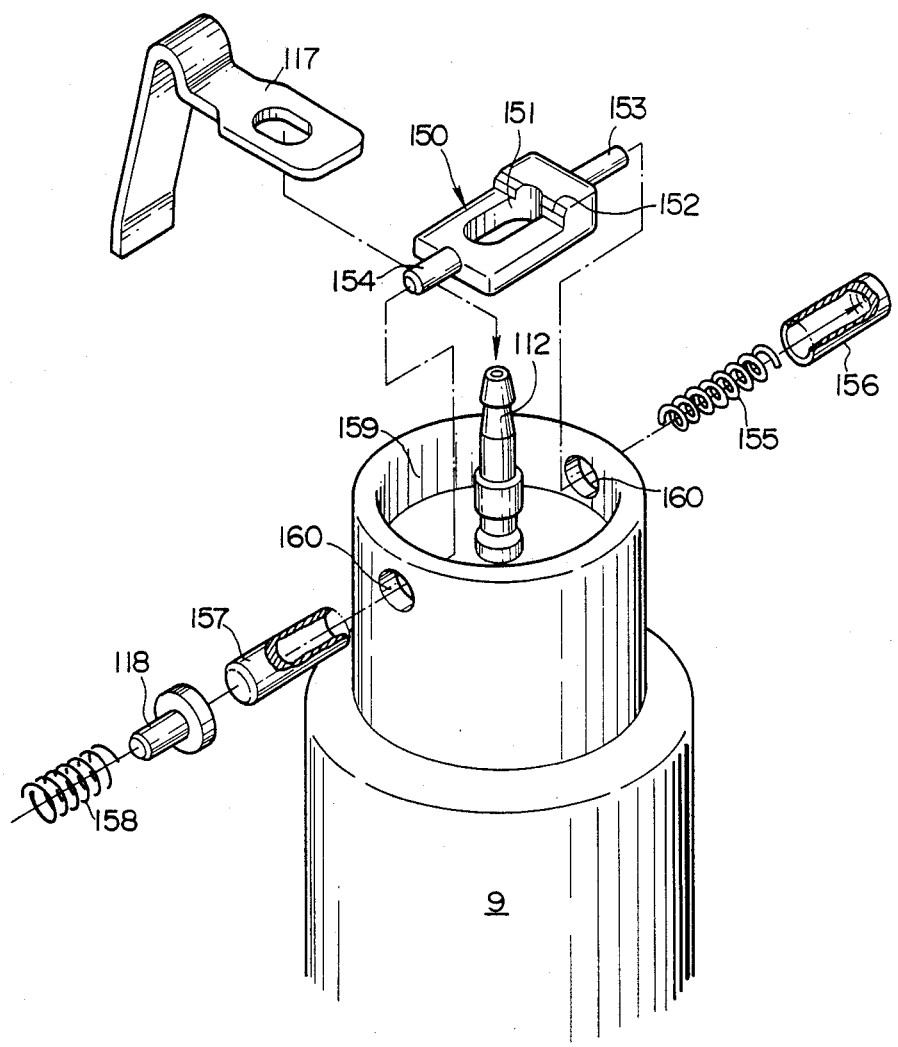
FIG. 23 is an exploded perspective view of the above FIG. 19.

With reference to FIG. 17 and FIG. 18, on the upper part of the reservoir (9) the gas release valve (110) is disposed to control the release of the fuel gas from the said reservoir. The valve (110) includes a fixed cylinder (111) fit in the upper wall of the reservoir and a movable valve body (112) slidable in the cylinder (111). The movable valve body (112) freely contacts or detaches to the valve seat (113) formed in the cylinder (111) and has a seal material (115) controlling the opening of the valve aperture (114). The upper end of the movable valve body (112) extends outwardly to connect with the gas pipe (16) made of flexible rubber pipe. It also connects with the valve opening lever (117). On one end of the valve opening lever (117), a function handle (133) is disposed to contact or to detach optionally. When the handle (133) comes down, it pushes the end of the valve opening lever (117) as shown in FIG. 18. As a result of this lever action, the movable valve body (112) is pushed upwardly to open the valve. Thus, flow of the gas fuel is initiated and it comes into the gas pipe (16) accordingly. The gas pipe (16) and the operating pipe (30) extend axially upwardly in the middle member from the reservoir (9), With reference to FIG. 19 to FIG. 23, in correspondence with the movement of the movable valve body (112) extending outward from the upper part of the gas reservoir (9), the stopper plate (150) is installed on the lower part of the valve opening lever (117) holding the said lever (117) in the open position. As shown in FIG. 23, the stopper material is made of a plate material, on the central part of which an oblong hole (151) is drilled through. The said movable body (112) is able to slide steadily along the hole (151) in the horizontal direction. When the stopper plate (150) comes into the underneath of the valve opening lever (117), it prevents the falling down of the said lever (117) whereas it maintains the opening condition as shown in FIG. 21.

On one side of the stopper plate (150), a stepped part (152) is formed, and where the side contacts with the stepped part (152) the sliding movement of the stopper (150) is constrained. On both sides of the stopper plate (150), pins (153) (154) are disposed. One pin (153) guides the horizontal sliding movement of the stopper plate (150), and moves in and out freely through the guide cylinder (156) installed with the coil spring (155) and it always keeps in tension with the said spring (155). By means of the tension, the stopper plate (150) is always biased toward the underneath of the valve opening lever (117). On the other hand, the other pin (154) is tightly fixed with the intermediate cylinder (157), on the top of which extends the said stopper release button (118).

When the valve opening material (117) moves upwardly to elevate the movable valve body (112), the lever (117) removes the contact with the stepped part (152). As a result, the stopper plate (150) moves in the underneath of the valve opening lever (117) by the tension power of the spring (155). The valve opening lever (117) is thus prevented from restoring to its fixed place and is kept on the upper directing position and the valve opening condition is maintained so as to allow the constant flow of fuel gas. The relative movement of the stopper plate (150) affects the intermediate cylinder (157) to push out the stopper release button (118) to the outside. In case of extinguishing, the said stopper release button (118) is forcibly pushed in against the spring. Then the stopper plate (150) comes out of the underneath of the valve opening lever (117) as well as the movable valve body (112) is allowed to fall down, wherefore the gas release valve is closed. The side of the valve opening lever (117) falls down and contacts with the stepped part (152) of the stopper plate (150), whereon the sliding movement of the stopper plate (150) is restrained.

The guide cylinder (156) and the intermediate cylinder (157) extend up to the outside running through the hole (160) formed in the cylindrical wall (159) on the upper part of the reservoir (9). The guide cylinder (156), as shown in FIG. 21, stays fixedly on the inner surface of the grip member (1).

Figure 24:
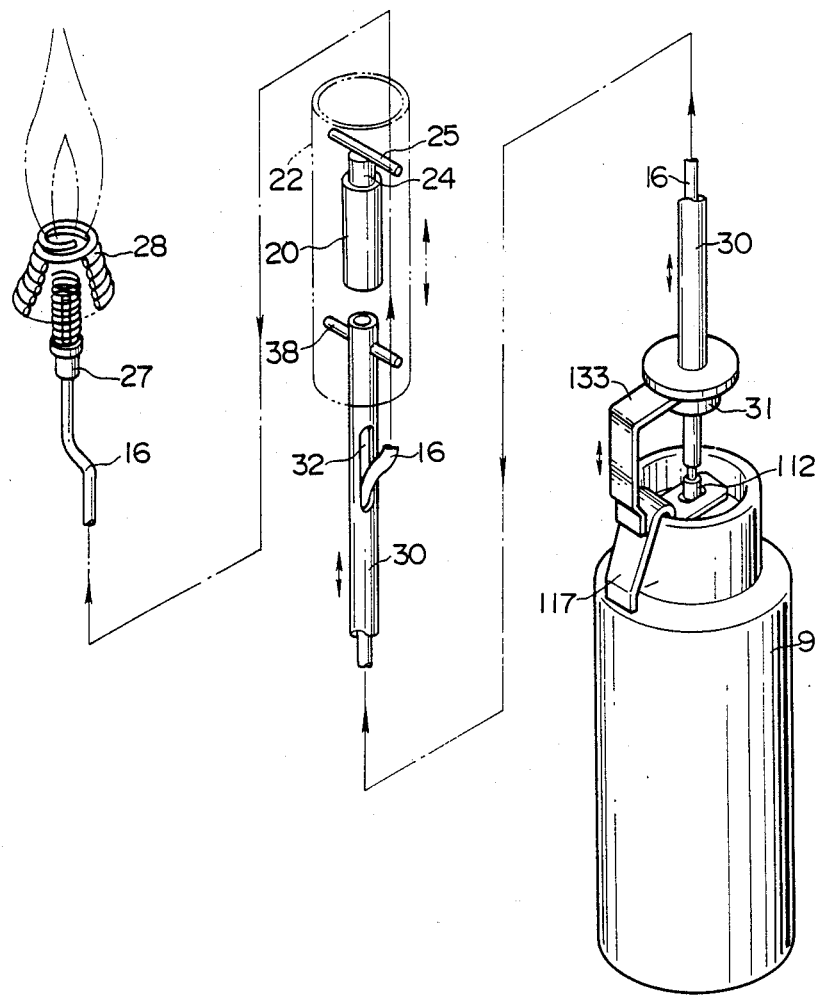
FIG. 24 is a partly diagrammatic perspective view indicating the operations and mechanisms for fuel gas release and generation of high voltage.

The operation of the ignition will now be explained below. With reference to FIG. 24, the operation cylinder (22) is first moved downwardly toward the grip member (1). The movement of the operation cylinder (22) moves the operation handle (24) of the electric spark generator device (20) connected with the cylinder by the first pin (25) and the second pin (38) and also the operation pipe (30). The movement of the operation pipe (30) lowers the uniting material (31) formed in the lower end part which moves the valve opening lever (117) via the operation handle (133) to elevate one end thereof by lever action. The movable valve body (112) thus moves upwardly and the stopper plate (150) also comes in the underneath of the valve opening lever (117). Thus, the gas release supply (110) is opened and gas flow from the reservoir (9) is initiated and a constant gas supply condition is maintained. The fuel gas arrives at the burner nozzle (27) via the gas pipe (116) and finally is emitted outside.

The operating handle (24) of the piezo-electric device (20) is pushed down to generate a high voltage spark. The spark occurs between the nozzle and the windshield material 928), via the leading wire, in synchronism with the mission of gas fuel, and finally generates a flame.

After ignition as above, although the operating cylinder (22) is released from the hand power and it restores to its original position, the gas supply valve (110) is still kept on its gas supply condition by the power of the stopper (150). Therefore, the flame is maintained in a continuously burning state. Accordingly, the continuous burn is correctly sustained for the time required, and it can light plural candles or other objects, optionally.

In order to extinguish the flame, the stopper release button (118) is pushed in forcibly, then the stopper plate (150) moves out of the underneath of the valve opening lever (117), whereon the said lever (117) falls down to close the gas supply valve (110). Accordingly, the gas supply is discontinued for the extinguishment.

In accordance with this second embodiment, the time interval and the distance gap between the gas supply and the sparking generation are both possibly minimized. Therefore, its mechanism is simpler with less costs and minor malfunctions, which increase the practical merits in its final stage.

In the second embodiment, the gas supply valve is established in the upper part of the reservoir, whereas it is needless to facilitate the gas pipe and the operation pipe along the outer circumference of the reservoir, which shall bring the further merits to make the reservoir larger to some extent to reserve greater volume of fuel therein.

I claim:

1. An elongated ignition apparatus comprising:
   (a) a grip member, an ignition member and a middle member uniting together said grip member on one end and said ignition member on the other end,
   (b) a fuel reservoir disposed in said grip member and having a gas supply valve,
   (c) a burner nozzle coupled to said ignition member and being connected to the gas supply valve via a gas pipe,
   (d) an electric spark generator disposed in the ignition member for generating a spark in the vicinity of the burner nozzle with electrical contact,
   (e) means disposed in the ignition member for actuating the gas supply valve,
   (f) the gas pipe uniting said reservoir and the said burner nozzle and
   (g) release means operatively coupled to the gas supply valve for releasing gas in correspondence with actuation of said actuator means.

2. An elongated igniting apparatus as recited in claim 1, wherein said electric spark generator, the actuator means of the gas supply valve and the release means of the gas supply valve are all operable manually from outside.

3. An elongated igniting apparatus as recited in claim 1, wherein said actuator means of the gas supply valve includes means for holding the gas supply valve in an open condition for a predetermined period of time in order to maintain the continuous burn of the flame.

4. An elongated igniting apparatus as recited in claim 1, wherein the grip member includes an oblong see-through hole to indicate gas fuel in the reservoir from outside.

5. An elongated ignition apparatus comprising:
   a grip member, an ignition member and a middle member uniting together the grip member on one end and the ignition member on the other end,
   a fuel reservoir disposed in the grip and having upper and lower portions and a gas supply valve on the upper portion,
   a burner nozzle coupled to the ignition member and connecting with the gas supply valve on the upper portion of the reservoir via a gas pipe,
   an electric spark generator disposed in the ignition member to generate a spark in the vicinity of the burner nozzle with electrical contact,
   actuator means disposed in the ignition member for actuating the gas supply valve, the gas pipe passing through the middle member and uniting the reservoir and the burner nozzle,
   release means operatively coupled to the gas supply valve for releasing gas in correspondence with the actuation of actuator means and the electric spark generator, the actuator means of the gas supply valve and the release means of the gas supply valve being accessible from outside and operable by hand, and the actuator means of the gas supply valve being operable to hold the gas supply valve in an open condition for a selectable time in order to maintain the continuous burn of a flame, and the release means being capable of releasing the above maintenance accordingly, and an oblong see-thru window hole formed in the grip member so as to indicate the remaining gas fuel in the reservoir from outside.

6. An elongated ignition apparatus comprising:
(a) a grip member, an ignition member and a middle member uniting together the said grip member on one end and the said ignition member on the other end,
(b) a gas fuel reservoir disposed in the grip member and having an upper portion and a lower portion and a gas supply valve on the upper portion and an inlet valve on the lower portion for gas refilling,
(c) a burner nozzle coupled to the ignition member and connecting with the gas supply valve on the upper portion of the reservoir via a gas pipe,
(d) an electric spark generator disposed in the ignition member to generate a spark in the vicinity of the burner valve with electrical contact,
(e) actuator means disposed in the ignition member for actuating the gas supply valve,
(f) the gas pipe passing through the middle member and uniting the said reservoir and the said burner nozzle, and
(g) release means for releasing the gas supply valve and working in correspondence with the said actuator means.

7. An elongated igniting apparatus as recited in claim 6, wherein the electric spark generator, the actuator means of the gas supply valve and the release means of the gas supply valve are all accessible from outside and are operable by hand.

8. An elongated igniting apparatus as recited in claim 6, wherein the actuator means of the gas supply valve holds the gas supply valve in an open condition for a selectable time in order to maintain the continuous burn of a flame, and releases the gas supply valve to effect a closed condition.

9. An elongated igniting apparatus as recited in claim 6, further comprising an oblong see-thru window hole formed in the grip member so as to indicate the remaining gas fuel in the reservoir from outside.

10. An elongated ignition apparatus as recited in claim 6, wherein the gas supply valve includes a stopper movably mounted under a valve opening for down and up movement, the stopper being spring biased in order to come in the underneath of the valve opening, and a stopper release button to be pushed into forcibly from the outside for driving the stopper freely out of the underneath of the valve opening.

11. An igniting apparatus comprising:
an extension member having two opposite ends;
a grip member connected to one end of the extension member and having a fuel reservoir disposed therein, the fuel reservoir having a gas release valve;
an ignition member connected to the opposite end of the extension member and having a burner nozzle;
a spark generator coupled to the burner nozzle;
a conduit running through the extension member for communicating fuel from the gas supply valve of the reservoir to the burner nozzle of the ignition member; and
means for simultaneously actuating the gas supply valve and the spark generator to ignite fuel released from the reservoir;
wherein the gas supply valve is disposed in an upper end of the reservoir, and the means for simultaneously actuating the gas supply valve and the spark generator include an outer sleeve of the ignition member operably coupled to the spark generator and an operating rod coupled to the outer sleeve and the gas supply valve, wherein movement of the outer sleeve imparts actuating movement in the spark generator and the gas supply valve.

12. An igniting apparatus as recited in claim 11 wherein the means for simultaneously actuating the gas supply valve and the spark generator includes means for holding the gas supply valve in an open position.

13. An igniting apparatus according to claim 11, further comprising a stop catch for holding the gas supply valve in the open position.

14. An igniting apparatus according to claim 13, wherein the means for simultaneously actuating the gas supply valve and the spark generator include a lever operably coupled to the operating rod for moving the gas supply valve in response to movement of the operating rod, and the stop catch includes a plate slidably movable under the lever and being spring biased to move into a holding position when the lever has lifted the gas supply valve into an open position.

15. An elongated ignition apparatus comprising:
a grip member, an ignition member and a middle member uniting together the grip member on one end and the ignition member on the other end,
a gas fuel reservoir disposed in the grip member and having an upper portion and a lower portion and a gas supply valve on the upper portion and an inlet valve on the lower portion for gas refilling,
a burner nozzle disposed in the ignition member and connecting with the gas supply valve on the upper portion of the reservoir via a gas pipe,
an electric spark generator disposed in the ignition member to generate a spark in the vicinity of the burner nozzle with electrical contact,
actuator means disposed in the ignition member for actuating the gas supply valve, the gas pipe passing through the middle member and uniting the reservoir and the burner nozzle and
Release means operatively coupled to the gas supply valve for releasing in correspondence with actutation of the said actuator means,
Oblong see-thru window hole formed in the grip member so as to indicate the remaining gas fuel in the reservoir from outside, and,
Stopper material movable underneath a valve opening lever for controlling down and up movement of the gas supply valve so that it may normally maintain the valve opening lever in the opening position, and the stopper material being biased by a spring in order to normally seat in the valve opening, and a stopper release button coupled to the valve opening lever and being forcibly movable inwardly from outside, the button driving the stopper material freely out from underneath the valve opening lever for closing said valve opening.

* * * * *